US006414827B1

(12) United States Patent
Young et al.

(10) Patent No.: US 6,414,827 B1
(45) Date of Patent: Jul. 2, 2002

(54) CLOSED-LOOP SCALING FOR DISCRETE-TIME SERVO CONTROLLER IN A DISC DRIVE

(75) Inventors: Peter M. Young, Fort Collins, CO (US); John C. Morris, Minneapolis, MN (US); Mike E. Baum, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/475,523

(22) Filed: Dec. 30, 1999

Related U.S. Application Data

(60) Provisional application No. 60/121,055, filed on Feb. 22, 1999.

(51) Int. Cl.[7] .................................................. G11B 5/596
(52) U.S. Cl. ...................................... 360/678.09; 360/75
(58) Field of Search .............................. 360/75, 78.09, 360/78.05, 77.04, 78.04, 69, 77.02; 702/186

(56) References Cited

U.S. PATENT DOCUMENTS

| | | | | |
|---|---|---|---|---|
| 5,189,578 A | 2/1993 | Mori et al. | .................. | 360/106 |
| 5,325,244 A | 6/1994 | Takano et al. | ........... | 360/77.03 |
| 5,404,235 A | 4/1995 | Painter | ..................... | 360/77.04 |
| 5,465,034 A | 11/1995 | Andrews, Jr. et al. | ...... | 318/560 |
| 5,475,545 A | 12/1995 | Hampshire et al. | ...... | 360/78.06 |
| 5,566,095 A | 10/1996 | Cameron et al. | ...... | 364/571.01 |
| 6,101,058 A * | 8/2000 | Morris | ........................ | 360/69 |

FOREIGN PATENT DOCUMENTS

| | | | | |
|---|---|---|---|---|
| WO | WO 99/08267 | 2/1999 | ........... | G11B/5/596 |
| WO | WO 99/08269 | 2/1999 | ........... | G11B/15/46 |

OTHER PUBLICATIONS

"Experimental Control and Model Validation: A Helicopter Case Study", by John C. Morris, 1996, California Institute of Technology, Pasadena California.

"Model Validation, Control, and Computation" by Matthew Philip Newlin, 1996, California Institute of Technology, Pasadena, California.

"The Complex Structure Singular Value", by A. Packard and J. Doyle, *The Journal of IFAC*, Jan. 1993, vol. 29, No. 1, pp. 71–109.

"Analysis of Feedback Systems With Structured Uncertainties", by John Doyle, *IEEE Proc.*, vol. 129, No. 6, Nov. 1982, pp 242–250.

"Performance and Robustness Analysis for Structured Uncertainty", by John C. Doyle, et al., *IEEE*, 1982, pp. 629–636.

"Structured Uncertainty in Control System Design", by John C. Doyle, *IEEE*, 1985, pp. 260–265.

"$\mu$–Synthesis—A Non–Conservative Methodology for Design of Controller with Robustness Towards Dynamic and Parametric Uncertainty", by Steen Toffner–Clausen and Palle Andersen, admitted prior art.

* cited by examiner

*Primary Examiner*—Andrew L. Sniezek
(74) *Attorney, Agent, or Firm*—Joseph R. Kelly; Westman, Champlin & Kelly, P.A.

(57) ABSTRACT

A method of configuring a discrete-time servo controller in a fixed-point digital signal processor (DSP) for controlling a servo actuator in a disc drive includes obtaining a stable, closed-loop representation of the servo controller and the servo actuator. Bounds on the controller states are derived from the stable closed-loop representation. The controller states are scaled based on the controller state bounds, and the servo controller is configured in the DSP based on the scaled controller states.

15 Claims, 6 Drawing Sheets

CLOSED-LOOP SCALING FOR DISCRETE-TIME SERVO CONTROLLER IN A DISC DRIVE

CROSS-REFERENCE TO APPLICATION

The present invention claims priority from Provisional Application Serial No. 60/121,055, filed Feb. 22, 1999 and entitled CLOSED-LOOP SCALING FOR GENERAL OUTPUT FEEDBACK DISCRETE-TIME CONTROLLERS TO PREVENT OVERFLOW WHEN IMPLEMENTED ON FIXED-POINT PROCESSORS;

reference is also made to, and priority is claimed from. U.S. patent application Ser. No. 09/026,259, now U.S. Pat. No. 5,978,752 filed on Feb. 19, 1998 entitled MODEL VALIDATION ALGORITHM FOR CHARACTERIZING PARAMETERS AND UNCERTAINTY IN A DISC DRIVE and U.S. patent application Ser. No. 09/026,455, (now abandoned) filed Feb. 19, 1998 entitled DISC DRIVE WITH ROBUST TRACK FOLLOWING SERVO CONTROLLER;

reference is also made to, and priority is claimed from. U.S. patent application Ser. No. 09/026,457, (now U.S. Pat. No. 6,101,058) filed on Feb. 19, 1998 entitled METHOD OF IMPLEMENTING A LINEAR DISCRETE-TIME STATE-SPACED SERVO CONTROL SYSTEM ON A FIXED-POINT DIGITAL SIGNAL PROCESSOR IN A DISC DRIVE.

Reference is also made to the following articles which are publicly available from the institutions mentioned: Matthew P. Newlin, *Model Validation, Control, and Computation*, Ph.D. THESIS California Institute of Technology, 1996; and John C. Morris, *Experimental Control and Model Validation: A Helicopter Case Study*, Ph.D. THESIS, California Institute of Technology, 1996.

FIELD OF THE INVENTION

The present invention relates generally to a servo system in a disc drive. More particularly, the present invention relates to implementing a robust servo control system in a disc drive.

BACKGROUND OF THE INVENTION

A typical disc drive includes one or more discs mounted for rotation on a hub or spindle. A typical disc drive also includes one or more transducers supported by a hydrodynamic air bearing which flies above each disc. The transducers and the hydrodynamic air bearing are collectively referred to as a data head. A drive controller is conventionally used for controlling the disc drive system based on commands received from a host system. The drive controller controls the disc drive to retrieve information from the discs and to store information on the discs.

An actuator operates within a negative feedback, closed-loop servo system. The actuator typically includes an actuator arm that supports a flexure or flexure assembly which, in turn, supports the data head. The actuator moves the data head radially over the disc surface for track seek operations and holds the transducer directly over a track on the disc surface for track following operations.

Information is typically stored on the discs by providing a write signal to the data head to encode information on the surface of the disc representing the data to be stored. In retrieving data from the disc, the drive controller controls the actuator so that the data head flies above the disc, sensing the information on the disc, and generating a read signal based on that information. The read signal is then decoded by the drive controller to recover the data represented by the information stored on a disc, and consequently represented in the read signal provided by the data head.

Accurate positioning of the data head over a track on the disc is of great importance in writing data to the disc and reading data from the disc.

In prior systems, servo operations were accomplished based on a dedicated servo head. In a dedicated servo type of system, servo information is all written to one dedicated surface of a disc in the disc drive. All of the heads in the disc drive are mechanically coupled to the servo head which is used to access the servo information. Thus, all of the heads in the dedicated servo disc drive are positioned based on the servo information read from the servo surface. This type of system allows the disc drive to conveniently execute parallel read and write operations. In other words, with appropriate circuitry in the drive controller, read and write operations can be executed in parallel using a plurality of the data heads mounted on the actuator, the data heads being simultaneously positioned based on the servo information read from the dedicated servo surface.

However, track densities on magnetic discs have been increasing for many years. Increased track densities on the magnetic disc require more accurate and higher resolution positioning. The mechanical offset between heads in a dedicated servo system can exceed one track width. Thus, the industry has seen a shift to embedded servo information in certain applications.

In an embedded servo system, servo information is embedded on each track on each surface of every disc. Thus, each data head returns a position signal independently of the other data heads. Therefore, the servo actuator is used to position each individual data head while that particular data head is accessing information on the disc surface. The positioning is accomplished using the embedded servo data for the track over which the data head is then flying.

While this results in increased positioning accuracy and higher resolution in the positioning process (because the data head is positioned independently of any other data heads), certain disadvantages are encountered because of increased track density and mechanics. One of the disadvantages is that in typical embedded servo systems, the ability to execute parallel read and write operations using a plurality of heads is lost. That is because the servo system is positioning based on information received by one individual data head, and the mechanical tolerances are inadequate to accurately position the other data heads in high track density systems. Also, current actuators are incapable of independently positioning the data heads. Thus, embedded servo systems, to date, have been unable to execute parallel read and write operations, such as simultaneously reading or writing a full cylinder in a disc drive.

Because of these differences between dedicated and embedded servo systems, there is a trade off between servo sample rate and efficient user data storage.

In addition, there are many issues in both systems which affect the positioning accuracy and precision of the servo system. Some of the most important issues include the following:

1. Servo sample rate. The sample rate is limited by the spindle speed and the number of servo sectors per track in an embedded servo system.
2. Structural modes in the arm and head suspension.
3. External shock and vibration, which can be either linear or rotational or both.

4. Written-in position error which results from tracking errors which occurred when the servo tracks were written. This results in repeatable runout. Runout refers to the total positioning error while executing a track following operation. Runout is typically referred to as a static deviation while tracking over long periods of time. Because written-in position error is synchronized to the spindle speed, it is referred to as repeatable runout.

5. Bearing non-linearities. Such non-linearities result in rotational drag and hysteresis, particularly when the actuator is moving at low velocities.

6. Non-linearity due to flex circuit bias forces on the actuator. In other words, the actuator is coupled to the disc drive controller through a flex circuit. When the actuator positions the transducer at different radial positions on the disc, the flex circuit bias forces on the actuator can change.

7. Disc flutter which results in non-repeatable runout. The amount of disc flutter is dependent on the spindle speed and the stiffness of disc substrate.

8. Gain variation resulting from magnetic transducer non-linearity cross-track.

9. Position error sample noise resulting from media magnetic variability, electronic noise, etc.

Prior conventional servo controllers have included proportional-integral-derivative (PID) controllers which are composed of two components: an observer and a regulator. The observer receives input position information each time a servo sector is crossed, and estimates position and velocity. The regulator then provides feedback on the observed signals. In a seek mode, the regulator typically zeros the error between a reference velocity trajectory and the observed velocity. In track following mode, the regulator zeros the error between the desired track position and the observed track position. The regulator controls according to a PID control technique. Suffice it to say that PID controllers are highly advantageous in many disc drive applications.

However, PID controllers may not be advantageous or desirable in all disc drive applications. For example, it may be desirable to provide microactuators between the flexure assembly and the transducer or slider assembly, or on the actuator arm, or on the suspension or flexure assembly. Where microactuators are provided, the servo actuator system evolves from a single input single output (SISO) system where the input is an error signal and the output is a voice coil current signal, to a multiple input multiple output (MIMO) system which receives a variety of inputs from the microactuators and provides a position output signal to the voice coil motor and each of the microactuators. While such a system could be controlled by simply decentralizing a PID controller, this may present problems. For example, if a plurality of heads are simultaneously positioned, the positioning of one data head can be affected by the simultaneous positioning of adjacent or proximate other data heads. Further, high bandwidth positioning can excite the structural modes of the drive and cause vibration, ringing, or other interference which can tend to interfere with the positioning of adjacent data heads.

Many of these issues are mitigated by employing a general discrete time output feedback control approach. However, a number of problems present themselves when attempting to implement a discrete-time system on a fixed-point digital signal processor in a disc drive. For example, the computation capability provided in digital signal processors which may be used in a disc drive is typically quite limited. This raises a number of significant issues. The size and number of registers in a digital signal processor can be quite limited. When performing matrix calculations, the number of bits required to store the results of intermediate calculations may exceed the capacity of the registers in the digital signal processor. Thus, overflow presents a significant hurdle. In addition, the computation speed and structure, as well as the memory capacity, in a digital signal processor can make some matrix calculations highly impractical, simply due to the number of calculations which must be performed. Also, substantially all digital signal processors are fixed-point processors. Thus, implementing a linear discrete-time system in a digital signal processor can be highly impractical. Further, quantization errors in a conventional DSP can become appreciable rendering the control accuracy of the DSP in a servo system in the disc drive impractical.

The present invention addresses at least some of these or other problems, and offers advantages over the prior art.

SUMMARY OF THE INVENTION

A method of implementing a discrete-time servo controller in a fixed-point digital signal processor (DSP) for controlling a servo actuator in a disc drive includes obtaining a stable, closed-loop representation of the servo controller and the servo actuator. Bounds on the controller states are derived from the stable closed-loop representation. The controller states are scaled based on the controller state bounds, and the servo controller is configured in the DSP based on the scaled controller states.

The present invention is also directed to a disc drive which includes a servo controller coupled to a servo actuator used for controlling actuation of the servo actuator. The servo controller is configured with scaled controller states, scaled based on a bound on a state evolution for a closed-loop system including a servo controller and the servo actuator.

These and other beneficial features of the present invention will become apparent upon review of the following figures and related explanations.

DETAILED DESCRIPTION OF ILLUSTRATIVE EMBODIMENTS

Figure 1:
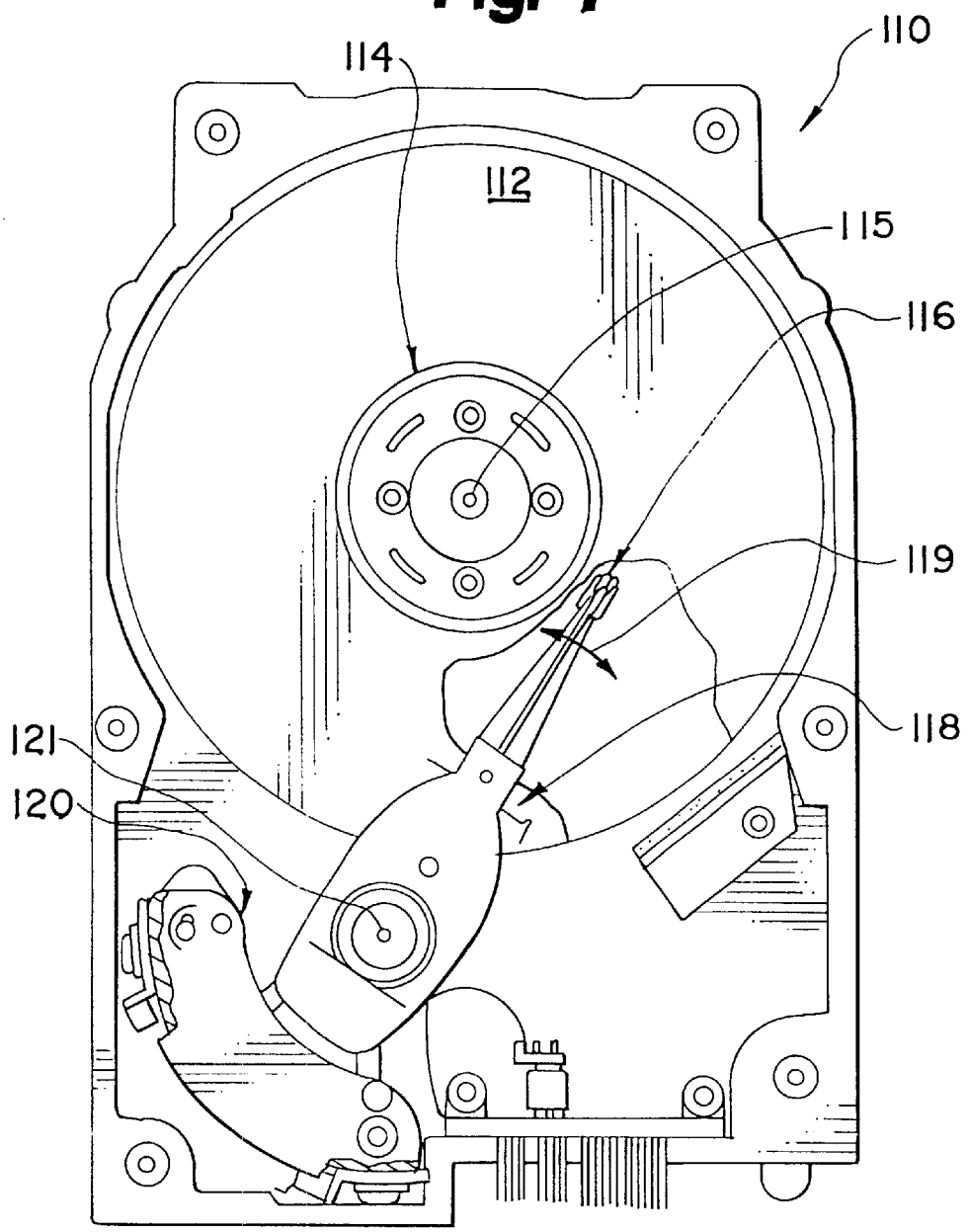
FIG. 1 illustrates a disc drive in accordance with one embodiment of the present invention.

FIG. 1 is a plan view of a typical disc drive 110. Disc drive 110 includes a disc pack 112, which is mounted on a spindle motor (not shown), by a disc clamp 114. Disc pack 112, in one embodiment, includes a plurality of individual discs which are mounted for co-rotation about a central axis 115. Each disc surface on which data is stored has an associated head gimbal assembly (HGA) 116 which is mounted to an actuator assembly 118 in disc drive 110. The actuator assembly shown in FIG. 1 is of the type known as a rotary moving coil actuator and includes a voice coil motor (VCM) shown generally at 120. Voice coil motor 120 rotates actuator assembly 118 with its attached HGAs 116 about a pivot axis 121 to position HGAs 116 over desired data tracks on the associated disc surfaces, under the control of electronic circuitry housed within disc drive 110.

Figure 2:
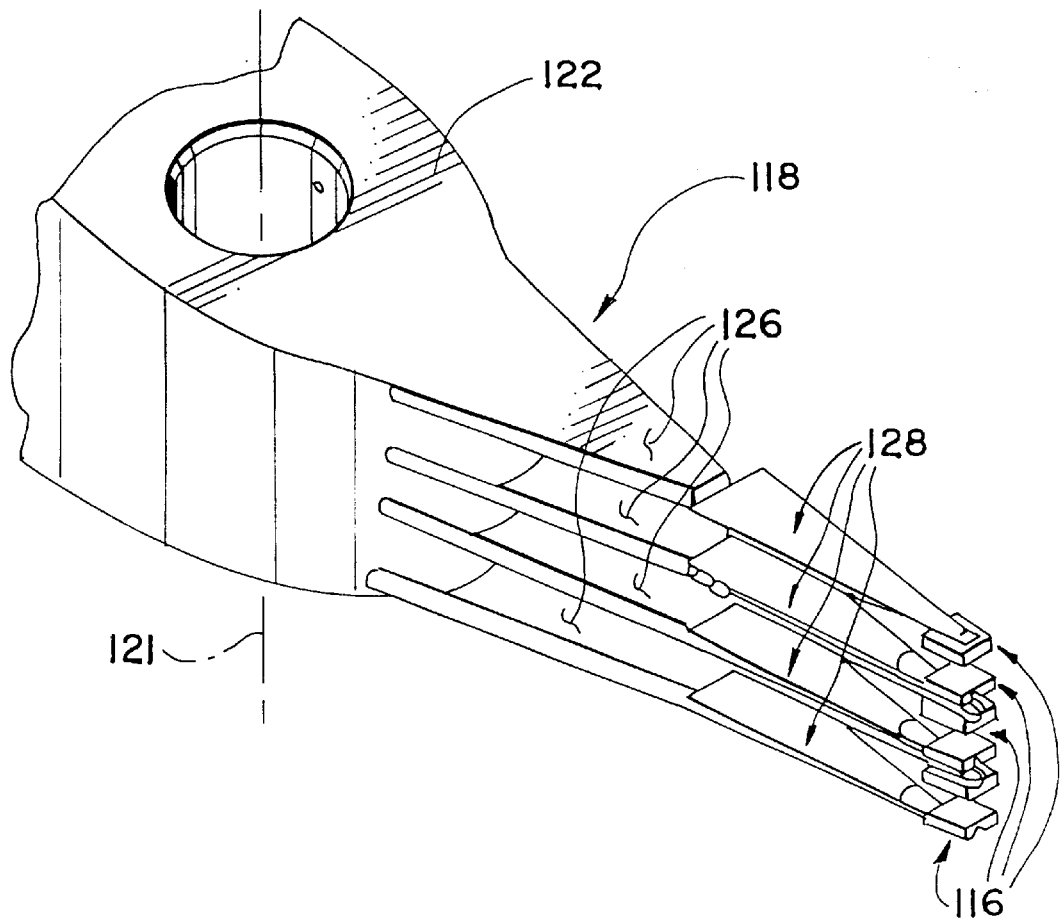
FIG. 2 illustrates an actuator assembly in accordance with one embodiment of the present invention.

More specifically, actuator assembly 118 pivots about axis 121 to rotate head gimbal assemblies 116 generally along an arc 119 which causes each head gimbal assembly 116 to be positioned over a desired one of the tracks on the surfaces of discs in disc pack 112. HGAs 116 can be moved from tracks lying on the innermost radius, to tracks lying on the outermost radius of the discs. Each head gimbal assembly 116 has a gimbal which resiliently supports a slider relative to a load beam so that the slider can follow the topography of the disc. The slider, in turn, includes a transducer which is utilized for encoding information (such as flux reversals in a magnetic disc drive) on, and reading information (e.g., flux reversals) from, the surface of the disc over which it is flying. FIG. 2 is a perspective view of actuator assembly 118. Actuator assembly 118 includes base portion 122, a plurality of actuator arms 126, a plurality of load beams 128, and a plurality of head gimbal assemblies 116. Base portion 122 includes a bore which is, in one embodiment, coupled for pivotal movement about axis 121. Actuator arms 126 extend from base portion 122 and are each coupled to the first end of either one or two load beams 128. Load beams 128 each have a second end which is coupled to a head gimbal assembly 116.

Figure 3:
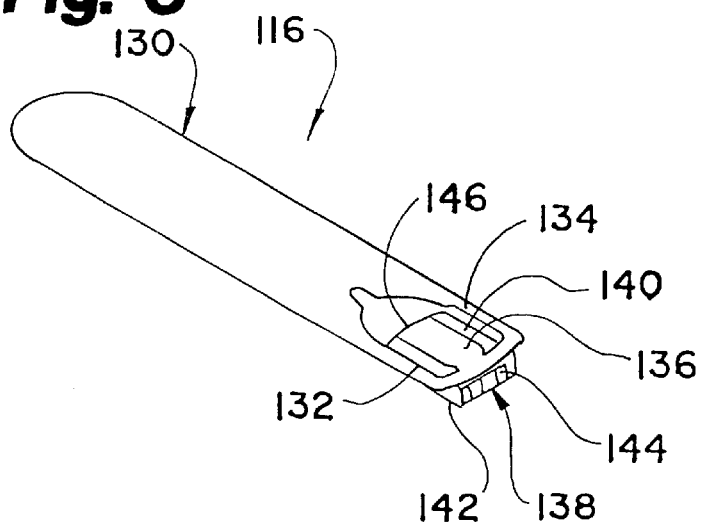
FIG. 3 illustrates a head gimbal assembly in accordance with one embodiment of the present invention.

FIG. 3 illustrates a greatly enlarged view of one embodiment of a head gimbal assembly 116. Head gimbal assembly 116 includes gimbal 130, which has a pair of struts 132 and 134, and a gimbal bond tongue 136. Head gimbal assembly 116 also includes slider 138 which has an upper surface 140 and an air bearing surface 142. Transducers 144 are located on a trailing (near right) edge of the bottom of slider 138. The particular attachment between slider 138 and gimbal 130 is accomplished in any desired manner. Briefly, in one embodiment, a compliant sheer layer is coupled between the upper surface 140 of slider 138 and a lower surface of gimbal bond tongue 136, with an adhesive. The compliant sheer layer permits relative lateral motion between slider 138 and gimbal bond tongue 136. The compliant sheer layer is illustratively a mylar film having a thickness of approximately 150 microns. Also, gimbal bond tongue 136 terminates at a trailing edge of slider 138 with a mounting tab 146 which provides a surface at which slider 138 is attached to gimbal bond tongue 136.

Figure 4:
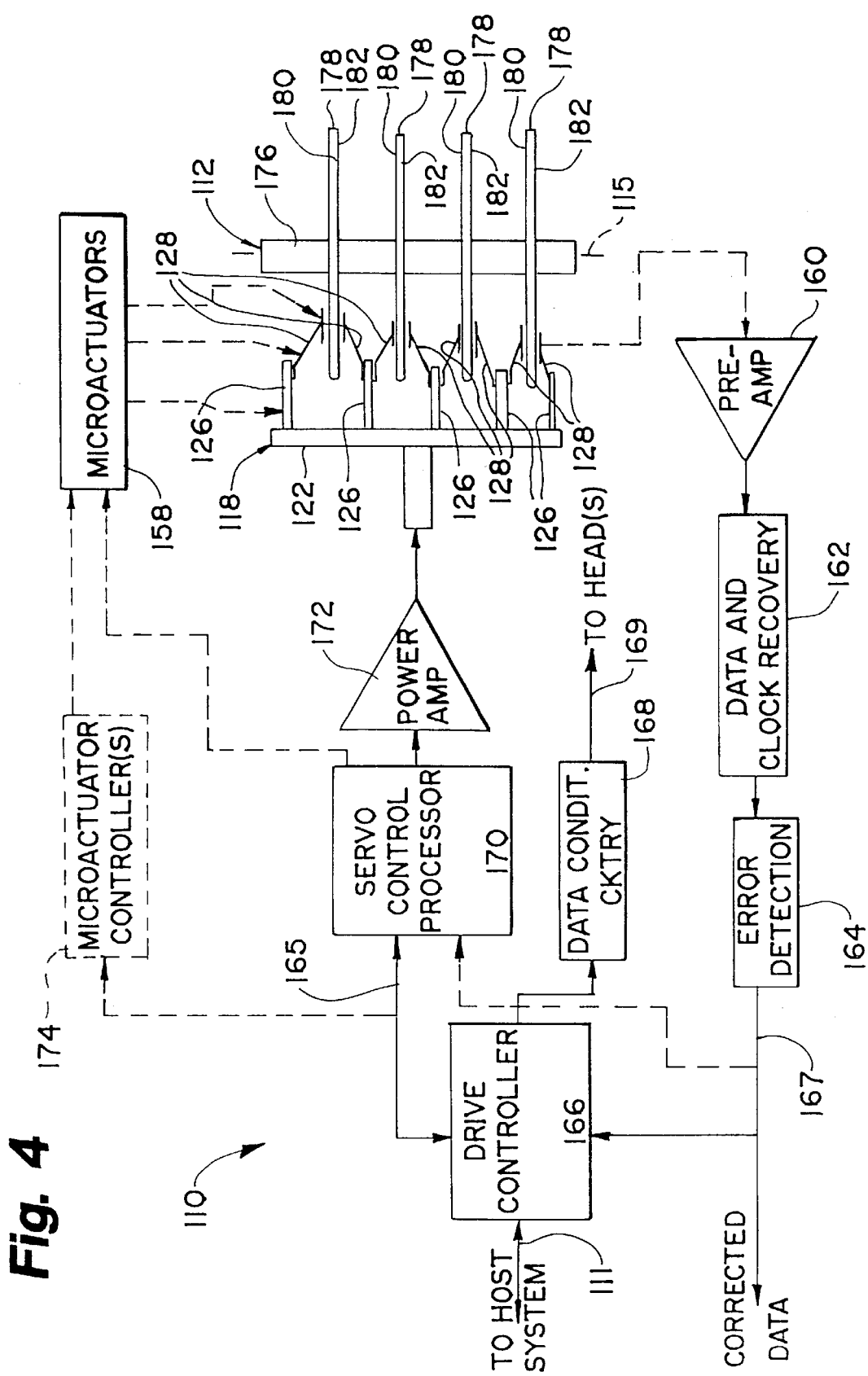
FIG. 4 is a block diagram of a portion of the disc drive in accordance with one embodiment of the present invention.

FIG. 4 is a block diagram of a portion of a disc drive 110, which illustrates a servo position control circuit in accordance with one embodiment of the present invention.

The present invention can be implemented in a system without microactuators in which a single coarse actuator implements the servo operations. However, the present description proceeds with respect to a servo system which includes microactuators, which can also benefit from the present invention. The portion of disc drive 110 which is illustrated in FIG. 4 includes actuator assembly 118, disc pack 112, microactuators associated with each head gimbal assembly (collectively referred to as microactuators 158), preamplifier 160, data and clock recovery circuit 162, error detection circuit 164, drive controller 166, data conditioning circuit 168, servo control processor 170, power amplifier 172, and optional microactuator controller(s) 174.

Drive controller 166 is illustratively a microprocessor or digital computer, or other suitable microcontroller, and is coupled by bus 111 to a host system or another drive controller which controls the plurality of drives.

Disc pack 112 includes spindle 176 which supports a plurality of coaxially arranged discs 178. Each disc 178 is mounted for rotation with spindle 176 about axis of rotation 115. Each disk 178 has a first surface 180 and a second surface 182. Surfaces 180 and 182 include concentric tracks for receiving and storing data in the form of, for example, flux reversals encoded on the tracks.

As described with respect to FIGS. 2 and 3, actuator assembly 118 includes base portion 122 supporting the plurality of actuator arms 126. Each of the actuator arms 126 is coupled to at least one of the load beams 128. Load beams 128, in turn, each support one of the head gimbal assemblies 116 (labeled in FIG. 3) above corresponding disc surfaces 180 or 182 for accessing data within the tracks on the disc surface. In one illustrative embodiment, each gimbal assembly also includes at least one microactuator 158 for positioning the transducers on the head gimbal assemblies within a track, or on one of a plurality of different tracks, on disc 178. It should again be noted that microactuators need not be used to obtain benefits from the present invention. As illustrated in FIG. 4, microactuators 158 can be provided on actuator arms 126, on load beams 128, on gimbals (or other flexures) 130, between gimbal 130 and associated sliders, or at any other suitable location. The microactuators 158 can be formed of PZT material, electrostatic material arranged to deflect accordingly, capacitive, fluidic, electromagnetic, magnetostatic, or thermally activated.

In operation, drive controller 112 typically receives a command signal from a host system which indicates that a certain portion of one or more of discs 178 are to be accessed. In response to the command signal, drive controller 166 provides servo control processor 170 with a position (or reference) signal 165 which indicates a particular cylinder over which actuator assembly 118 is to position head gimbal assemblies 116. Servo control processor 170 converts the position signal into an analog signal which is amplified by power amplifier 172 and is provided to the voice coil motor in actuator assembly 118. In response to the analog position signal, actuator assembly 118 positions load beams 128 and their associated head gimbal assemblies 116 over a desired cylinder.

The head gimbal assemblies 116 generate a read signal containing data from embedded servo position data which is stored on a selected portion of each track of the disc to be read, as well as normal data to be accessed from the selected portion of the disc to be read. The read signal is provided to preamplifier 160 which amplifies the read signal and provides it to data and clock recovery circuit 162. Data and clock recovery circuit 162 recovers data from the read signal, which is encoded on the disc surface when the data is written to the disc surface, in a known manner. Of course, data and clock recovery circuit 162 can be a partial response maximum likelihood (PRML) channel, or another suitable type of read channel.

Once the data is recovered, it is provided to error detection circuit 164 which detects whether any errors have occurred in the data read back from the disc and which provides an output 167. Errors are corrected by error detection circuit 164 or drive controller 166, or a combination of both, in a known manner.

During head positioning, drive controller 166 provides a position signal to servo control processor 170 causing actuator assembly 118 to position head gimbal assemblies 116 over a selected cylinder. In a sector servo positioning drive (or an embedded servo positioning drive), a portion of each sector on the disc surfaces has position information which is encoded thereon and which is read by the data head and provided, through the read channel, to servo control processor 170. The positioning information not only gives coarse position information indicating the particular track over which the data head is flying, it also provides tuning feedback to the servo control processor for better positioning. Servo control processor 170 reacts to the position information read from the disc and positions the head gimbal assemblies 116 accordingly.

In one embodiment, in which microactuators are used, servo control processor 170 is used to not only control the coarse actuator (voice coil motor) but it is also used to control microactuators 158. In another embodiment, a separate microactuator controller (or plurality of separate microactuator controllers) 174 are provided for controlling the microactuators 158 in response to the position request signal from drive controller 166 and also in response to the embedded position information read from the discs.

In order to write information to the discs, drive controller 166 receives not only the location of the information to be written on disc pack 112, but also receives the actual data to be written. The location information is provided to servo control processor 170 (and optionally microactuator controller(s) 174) as a reference signal to coarsely position the data heads relative to the corresponding disc surfaces. Then, drive controller 166 provides the data to be written to data conditioning circuitry 168, which in turn provides that information at an output 169 to the particular transducers on the head gimbal assemblies 116 so that the data can be written to the disc surfaces, in a known manner.

In one embodiment, microactuators 158 have a range of motion which is in excess of the worst case mechanical misalignment between any two of the head assemblies 116 supported by actuator assembly 118. In another embodiment, each microactuator 158 has a range of motion which is in excess of one track width, and may be in excess of a plurality of track widths. Also, in one embodiment, the read channel provided in disc drive 110 (which in the embodiment shown in FIG. 4 includes preamp 160, data and clock recovery circuit 162 and error detection circuit 164) is capable of receiving a plurality of simultaneous and parallel data signals and-processing those data signals in parallel, and providing them to the host system, and/or drive controller 166 in parallel. Further, in one embodiment, data conditioning circuitry 168 is also suitable for providing a plurality of simultaneous and parallel write signals to the data heads to execute a simultaneous and parallel write operation. Further, in one embodiment, servo controller processor 170 and optional microactuator controller(s) 174 are suitable for simultaneously providing positioning signals to microactuators 158 to simultaneously position all, or at least a plurality of, the microactuators so that a plurality of heads can be simultaneously aligned with tracks on a plurality of disc surfaces in disc pack 112.

While microactuators need not be used with the present invention, with this arrangement, a number of advantages are achieved. For example, precise position control can be accomplished on each of a plurality of the data heads. This allows precise and simultaneous track following on the plurality of data heads to allow parallel read and write operations. Further, because the bandwidth of the microactuator operation is much higher than that of the voice coil motor, this arrangement provides the ability to significantly increase the track density on any given disc surface because it accommodates bearing nonlinearity, and other problems which limit the track density of the current art, in a far superior fashion to simply using the voice coil motor for track following.

Further, since in one embodiment, each microactuator has a range of motion which is in excess of a plurality of data tracks, the microactuators, themselves, can be used to execute short seek operations (seek operations which seek to a track within the range of motion of the microactuator). This minimizes the excitation of structural modes in the disc drives and enables higher bandwidth servo-control during the short seeks.

Microactuators 158 can be controlled in any of a number of ways in accordance with the present invention. For example, the voice coil motor in a conventional disc drive is controlled by a servo controller which is a single input/singe output (SISO) system. The input is the head position measurement taken from the embedded servo data, and the output typically drives the voice coil motor through the power amplifier 172. However, in controlling microactuators 158, the servo control system of the present invention must have multiple inputs and multiple outputs. The inputs include the head positions read from the embedded servo information over which the heads are flying, and may also optionally, include the relative positions of one or more of the microactuators, relative to the voice coil motor (or coarse actuator). The multiple outputs include the outputs which drive the single coarse positioner (VCM) and a number N of the microactuators.

A potential problem which presents itself to the present architecture in which a plurality of data heads are simultaneously positioned is that the positioning of one data head can be affected by the simultaneous positioning of adjacent or proximate other data heads. High bandwidth positioning can excite the structural modes of the drive and cause vibration or other interference which can interfere with the positioning of adjacent data heads. Thus, in one embodiment of the present invention, the servo control processor 170 or microactuator controller(s) 174 account for the movement of other data heads on actuator assembly 118.

One arrangement is to use a PID observer based servo controller implemented as either a SISO controller (with no microactuator) or a MIMO controller (with microactuator). Another arrangement is to include a single servo controller including a MIMO servo controller implemented as a digital signal processor (DSP). The DSP has inputs indicating the head position of each head, the relative position of each microactuator and the reference signal from either the host controller, or from the disc drive controller 166.

Figure 5:
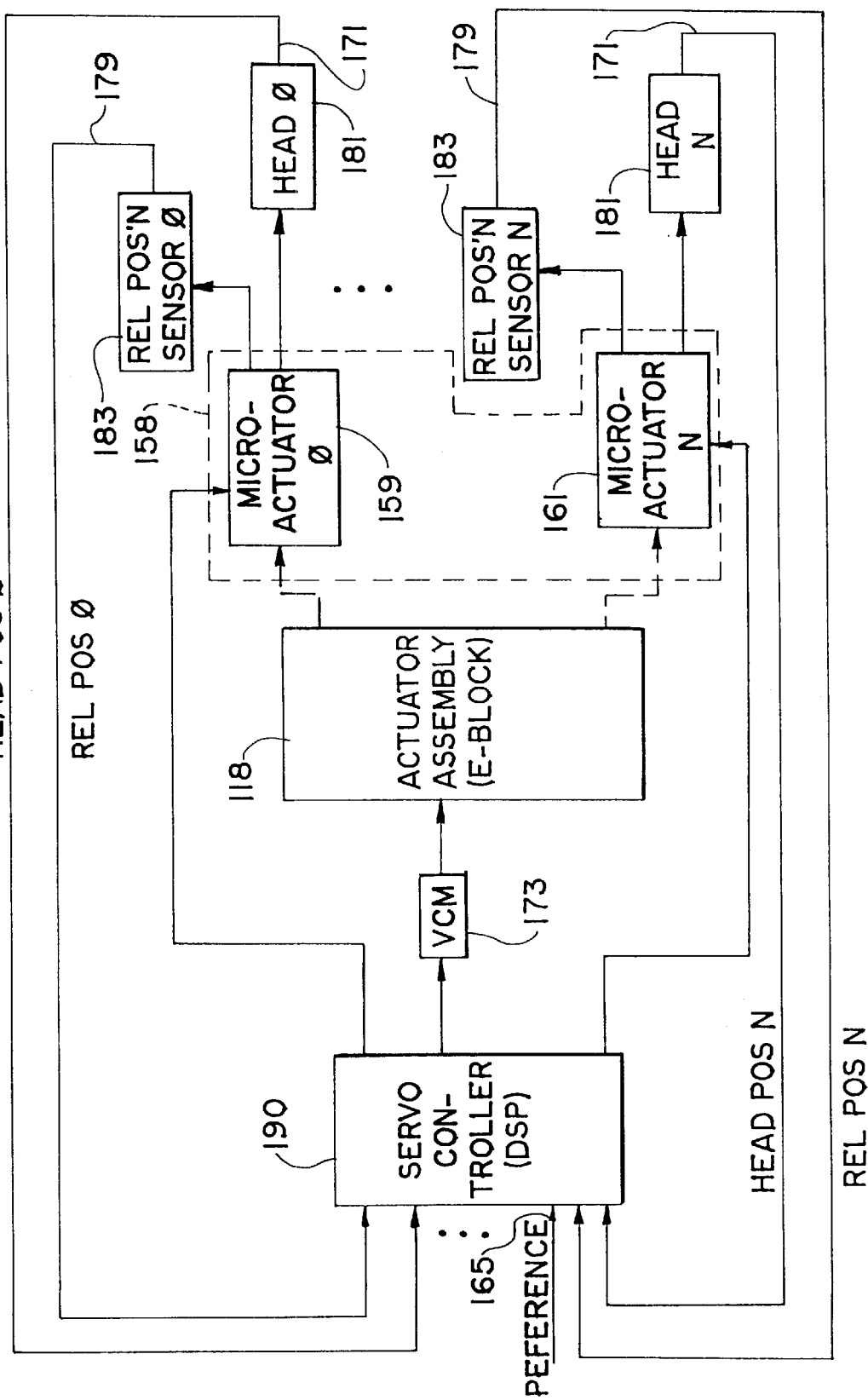
FIG. 5 is a block diagram of a portion of a servo control circuit in accordance with one embodiment of the present invention.

FIG. 5 illustrates an embodiment in which servo control processor 170 and microactuator controller 174 are combined into such a single servo controller, implemented as a DSP 190. DSP 190 receives as its inputs a reference signal 165 from the host system or disc drive controller 166, along with head position signals for each of the heads 181 (head 0–head N) which is indicative of the position of the head. An output from DSP 190 is provided to voice coil motor (VCM) 173 which drives actuator assembly (or E-block) 118. FIG. 5 also illustrates that DSP 190 provides output signals to all of the microactuators 158 (microactuator 0–microactuator N, also represented by designation numerals 159 and 161) coupled to actuator assembly 118. The inputs to DSP 190 also thus include head position signals 171 from the relevant heads, as well as relative position signals 179 of each of the heads with respect to VCM 173. Each of the microactuators is shown coupled to a head 181. Also, each of the microactuators has an associated relative position sensor 183 which senses the relative position of the microactuator, relative to the voice coil motor (or actuator assembly 118). The relative position sensor 183 can include any suitable sensor, such as a capacitive sensor or any other suitable type of position sensor. Thus, it can be seen that DSP 190 provides the coarse positioning signal to voice coil motor 173 for positioning the entire actuator assembly 118. DSP 190 also provides the fine positioning signals to microactuators 158.

In one embodiment, DSP 190 not only takes into account the head position and relative position associated with each head, but also takes into account movement of adjacent or proximate heads (i.e., it takes into account cross-coupling of the heads) when providing the microactuator output for each microactuator associated with each head. In this way, DSP 190 accounts for structural mode excitation when positioning each of the individual heads. Also, in one embodiment, DSP 190 controls to provide disturbance rejection, to account for runout, to prevent excessive actuator current, and to provide noise immunity.

Figure 6:
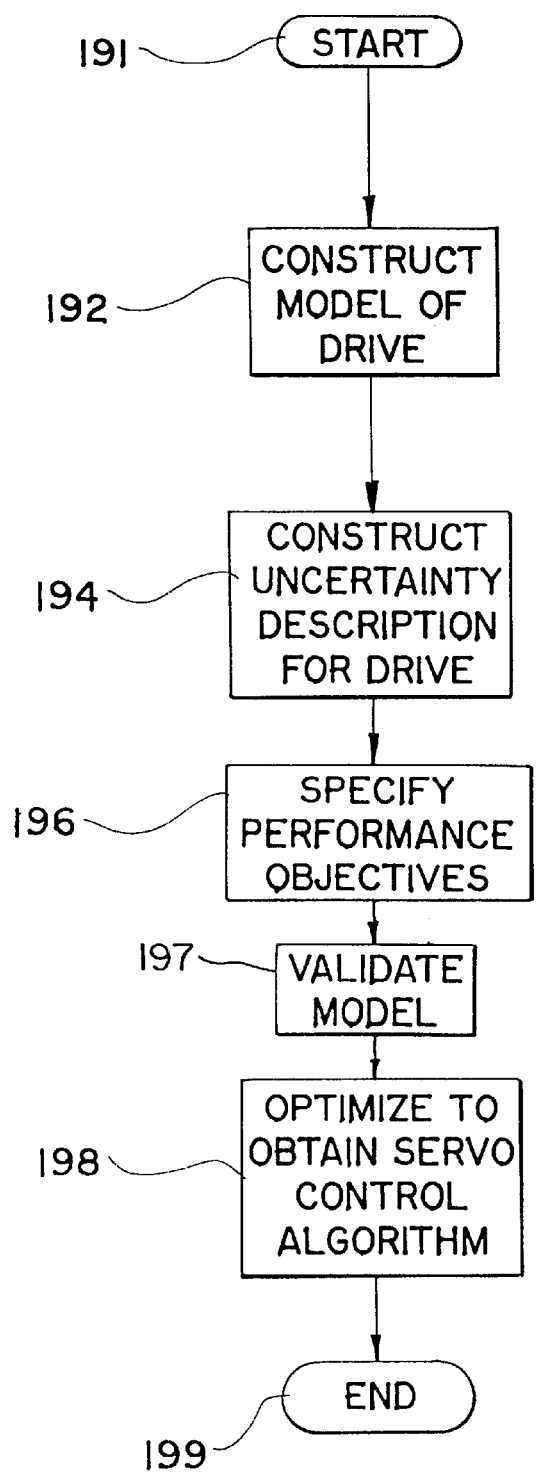
FIG. 6 is a flow diagram illustrating the construction of a servo control algorithm in accordance with one embodiment of the present invention.

The DSP 190 illustrated in FIG. 5 illustratively embodies either a PID or PID-observer based algorithm or a model-based algorithm. FIG. 6 (e.g., blocks 191–199) is a flow diagram illustrating one method in accordance with the present invention of developing the servo control system in which DSP 190 is implemented as a model-based algorithm. Each block in FIG. 6 will be briefly discussed as an overview, and the portions of the method and system pertinent to the present invention will then be discussed in greater detail.

A nominal model is first constructed which is primarily a set of differential equations that describe the structural dynamics of the disc drive. This is indicated by block 192 in FIG. 6. In constructing the nominal model, precise knowledge is illustratively known about the drive dynamics. This knowledge may be obtained using empirical/measured data. This type of information is used to define parameters in the system model, and all of this information may be used to construct a model from the first principles (or differential equations).

Next, an uncertainty description is constructed for the disc drive. This is illustrated by block 194 in FIG. 6. The uncertainty description is illustratively designed to capture the drive behavior, along with variations, associated with a large number of drives. This data is used to modify the model constructed in block 192.

Performance objectives of the system are then specified. This is indicated by block 196 in FIG. 6. Such objectives are provided to ensure that the model is compatible with existing, and commercially available, tools to optimize and finalize development of the control algorithm which can be implemented in a variety of ways directly on the disc drive.

The model is then validated. This is indicated by block 197 in FIG. 6. In short, the model constructed to this point is a robust control model which is a model for a system which contains not only a model of the system dynamics, but an uncertainty and noise description as well. In general, the model validation problem is formulated as a linear time invariant system with norm-bounded structured uncertainty and experimental data. Model validation is performed by considering the model validation problem in the frequency domain. Techniques referred to as $\mu$-analysis and $\mu_g$-analysis are performed to determine whether the model is consistent with the data and whether the controller is consistent with the model.

Finally, the model is optimized using commercially available optimization software. Algorithms for computing $\mu$ and optimization are available under the commercial designation MATLAB $\mu$-Analysis and Synthesis Toolbox. This is indicated by block 198 in FIG. 6.

The present invention is directed primarily to implementing the controller in a digital signal processor. Implementation of any type of discrete-time filter (such as discrete-time control system) in a closed-loop on a fixed-point processor or DSP requires efficient conversion of a floating point description of the control system into a fixed point description. A significant problem which must be addressed is maintaining adequate resolution in the arithmetic to prevent quantization errors from being introduced, while limiting the resolution to minimize computational requirements.

The present scaling algorithm is used to support the implementation of a general linear discrete-time state space SISO or MIMO servo controller on a fixed-point DSP in a disc drive. The present algorithm is much less conservative then previous scaling algorithms, such as those set out in the above-identified patent applications, and allows implementation on a fixed-point DSP with fewer bits than the previous algorithm.

In the prior algorithm, the states of the servo controller were scaled such that, under the worst case input to the servo controller, the states would not overflow the internal registers of the controller. This type of scaling does not take into consideration that the controller is part of a closed-loop servo system, and the worst case may allow for input signals to the controller that would not be present in a closed-loop environment.

Figure 7:
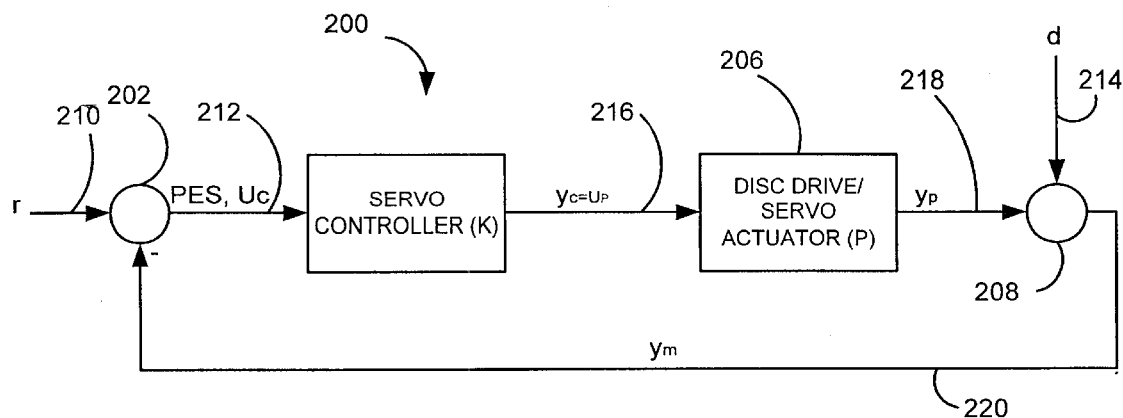
FIG. 7 is a block diagram of a representation of a closed-loop servo system in the disc drive.

FIG. 7 is a block diagram of a model of a closed-loop servo system in the disc drive. Model 200 includes summing node 202, servo controller model 204, disc drive model 206 and summing node 208. P represents a model of the disc drive mechanics. K represents a model of the servo controller. The input r, 210, represents the desired position of the head, and PES 212 represents the closed-loop position error. The external disturbance 214 is represented by d, and represents all of the exogenous disturbances acting on the disc drive that result in position error. The input to controller 204, $U_c$, is generally the drive position error signal (PES), the output of controller 204, $y_c$, is also the input, $U_p$, 216, to the disc drive 206. The output of the disc drive 218 is represented by $y_p$, and is generally the position of the read/write transducer. The measurement 220 is represented by $y_m$.

Figure 8:
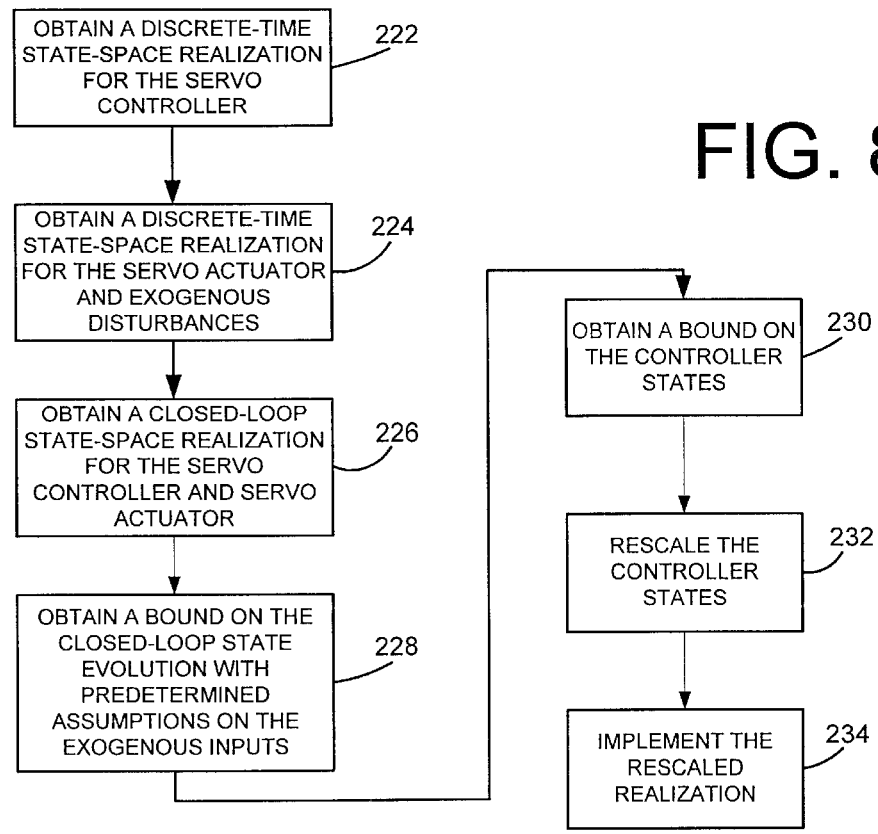
FIG. 8 is a flow diagram illustrating the implementation of a servo controller in a digital signal processor in accordance with one embodiment of the present invention.

FIG. 8 is a flow-diagram which illustrates implementing the servo controller in a DSP. The model of the servo controller 204, from FIG. 7, can be represented in discrete-time state-space format by the following set of equations, or realizations:

$$x_c(k+1) = A_c x_c(k) + B_c u_c(k) \quad \text{Eq. (1)}$$

$$y_c(k) = C_c x_c(k) + D_c u_c(k) \quad \text{Eq. (2)}$$

where $x_c$ is the controller state, $u_c$ is the controller input, and $y_c$ is the controller output. Assume that N is the dimension of $x_c$ and also represents the number of controller states. Obtaining these realizations is indicated by block 222 in FIG. 8.

The disc drive model 206, from FIG. 7, can be represented in discrete-time state-space format by the following set of equations:

$$x_p(k+1) = A_p x_p(k) + B_p u_p(k) \quad \text{Eq. (3)}$$

$$y_p(k) = C_p x_p(k) + D_p u_p(k) \quad \text{Eq. (4)}$$

where $x_p$ is the disc drive (or servo actuator) state, $u_p$ is the disc drive input, and $y_p$ is the disc dive output. Obtaining these realizations is indicated by block 224 in FIG. 8.

The closed-loop state-space equations governing FIG. 7 can be easily derived from the state-space equations of the controller and the disc drive set out as equations 1–4 above, using the following feedback equations:

$$u_c = r - y_m = r - (y_p + d) \quad \text{Eq. (5)}$$

$$u_p = y_c \quad \text{Eq. (6)}$$

The resulting closed-loop state-space equations are then given by:

$$\begin{bmatrix} x_c(k+1) \\ x_p(k+1) \end{bmatrix} = \begin{bmatrix} A_c - B_c(I + D_p D_c)^{-1} D_p C_c & -B_c(I + D_p D_c)^{-1} C_p \\ B_p(I + D_c D_p)^{-1} C_c & A_p - B_p D_c(I + D_p D_c)^{-1} C_p \end{bmatrix} \begin{bmatrix} x_c(k) \\ x_p(k) \end{bmatrix} + \begin{bmatrix} B_c(I + D_p D_c)^{-1} \\ B_p D_c(I + D_p D_c)^{-1} \end{bmatrix}(r(k) - d(k)) \quad \text{Eq. (7)}$$

$$y_m(k) = [(I + D_p D_c)^{-1} D_p C_c \quad (I + D_p D_c)^{-1} C_p] \begin{bmatrix} x_c(k) \\ x_p(k) \end{bmatrix} + [(I + D_p D_c)^{-1} D_p D_c \quad (I + D_p D_c)^{-1}] \begin{bmatrix} r(k) \\ d(k) \end{bmatrix} \quad \text{Eq. (8)}$$

Obtaining the closed-loop realizations is indicated by block 226 in FIG. 8.

The state evolution of the closed-loop system can be bounded under worst-case assumptions on the exogenous input signals r and d, as follows:

$$x_{cl}(k) = A_{cl}^k x(0) + \sum_{m=0}^{k-1} A_{cl}^{k-1-m} B_{cl} U_{cl}(m) \quad \text{Eq. (9)}$$

where $$x_{cl}(k) = \begin{bmatrix} x_c(k) \\ x_p(k) \end{bmatrix} \quad \text{Eq. (10)}$$

$$u_{cl}(k) = r(k) - d(k) \quad \text{Eq. (11)}$$

$$A_{cl} = \quad \text{Eq. (12)}$$

$$\begin{bmatrix} A_c - B_c(I + D_p D_c)^{-1} D_p C_c & -B_c(I + D_p D_c)^{-1} C_p \\ B_p(I + D_c D_p)^{-1} C_c & A_p - B_p D_c(I + D_p D_c)^{-1} C_p \end{bmatrix}$$

$$B_{cl} = \begin{bmatrix} B_c(I + D_p D_c)^{-1} \\ B_p D_c(I + D_p D_c)^{-1} \end{bmatrix} \quad \text{Eq. (13)}$$

Obtaining the bound is indicated by block 228 in FIG. 8.

From the equation governing state evolution of the closed-loop system, a bound on the states can be determined given a bound on the exogenous inputs, as indicated by block 230 in FIG. 8. In general, it will be assumed that the initial state of the controller is equal to 0 when computing these bounds.

$$\max_k |x_{cl}(k)| = \|x_{cl}\|_\infty = \left|\sum_{m=0}^{k-1} A_{cl}^{k-1-m} B_{cl} u_{cl}(m)\right| \quad \text{Eq. (14)}$$

$$\leq \sum_{m=0}^{k-1} |A_{cl}^{k-1-m} B_{cl} u_{cl}(m)| \quad \text{Eq. (15)}$$

$$\leq \sum_{m=0}^{k-1} |A_{cl}^{k-1-m} B_{cl}| \|r - d\|_\infty \quad \text{Eq. (16)}$$

$$\leq \left\| \begin{bmatrix} A_{cl} & B_{cl} \\ I & 0 \end{bmatrix} \right\|_1 \|r - d\|_\infty \quad \text{Eq. (17)}$$

The $l_\infty$-$l_\infty$ induced norm of $x_{cl}(k)$ is given by the $l_1$ norm of the closed-loop transfer function from exogenous disturbance, r(k)–d(k), to state $x_{cl}(k)$. The $l_1$ norm is easily computable given the closed-loop matrices $A_{cl}$ and $B_{cl}$. This norm is a worst case bound on the largest state of $A_{cl}$ and $B_{cl}(k)$. What is desired, instead, is the worst case bound on each individual state of $x_c(k)$. Recall that the first N elements of $x_{cl}(k)$ are the N controller states $x_c(k)$. From the previous equation, the bounds on the controller states, $x_c(k)$, can be calculated as follows:

$$\psi = \|r - d\|_\infty \lim_{k \to \infty} \sum_{m=0}^{k-1} |A_{cl}^{k-1-m} B_{cl}| \quad \text{Eq. (18)}$$

$$\|x_c^i\|_\infty = \psi_i; \quad \text{Eq. (19)}$$

the $i^{th}$ component of the vector $\psi$, i=. . . N

Also, it should be noted that the limit in equations 18 and 19 is guaranteed to converge if the closed-loop system is stable. Using the bounds on the state evolution, the controller states, $x_c(k)$, can be rescaled. This is indicated by block 232 in FIG. 8. The states are rescaled to guarantee that under worst case exogenous inputs, the states of the controller are bounded by magnitude 1. This scaling is given by the following diagonal state transformation:

$$T^{-1} = \begin{bmatrix} \|x_c^1\|_\infty & & & & \\ & \|x_c^2\|_\infty & & & \\ & & \ddots & & \\ & & & \|x_c^{N-1}\|_\infty & \\ & & & & \|x_c^N\|_\infty \end{bmatrix} \quad \text{Eq. (20)}$$

Using this state transformation, the new state controller realization is given by:

$$\hat{x}_c = Tx_c \quad \text{Eq. (21)}$$

$$\hat{x}_c(k+1) = TA_c T^{-1} \hat{x}_c(k) + TB_c u_c(k) \quad \text{Eq. (22)}$$

$$y_c(k) = C_c T^{-1} \hat{x}_c(k) + D_c u_c(k) \quad \text{Eq. (23)}$$

$$\max_k |\hat{x}_c(k)| = \|\hat{x}_c\|_\infty \le 1 \quad \text{Eq. (24)}$$

This new realization can be implemented on a DSP using fractional binary arithmetic, as indicated by block 234 in FIG. 8. Furthermore, this realization is guaranteed to not overflow if the $l_\infty$ norm of the exogenous disturbances, $\|r-d\|_\infty$ is less than the disturbance level used to construct the state transformation from ψ above.

It should also be noted that this method of scaling the controller states is not conservative. One can easily construct a disturbance whose $l_\infty$ norm is slightly larger than that used to construct the state transformation. Such a disturbance signal would cause the states to overflow. Thus, the present technique is the least conservative state realization for a discrete-time controller that is guaranteed to not overflow for a given, prespecified disturbance level. It should also be noted that the scaling technique of the present invention can be used regardless of the method used to design the controller and regardless of whether microactuators are used.

In accordance with once aspect of the present invention, a method is provided for implementing or configuring a model based, discrete-time servo controller in a fixed-point digital signal processor (DSP) for controlling a servo actuator 206 in a disc drive 110. The method includes obtaining a stable, closed-loop representation of the servo controller 204 and the servo actuator 206. Controller state bounds on the states of the controller for the servo controller 204 are determined from the stable, closed-loop representation. The controller states are scaled based on the controller state bounds. The servo controller is configured, based on the scaled controller states, in a DSP.

In one illustrative embodiment, obtaining the closed-loop model is performed by obtaining a state-space realization for the servo controller 204, obtaining a state-space realization for the servo actuator 206, and obtaining the closed-loop state-space realization based on the state-space realizations for the servo controller 204 and the servo actuator 206.

In another aspect of the present invention, determining the controller state bounds is performed by obtaining a state evolution for a closed loop system including the servo controller 204 and the servo actuator 206 based on the stable, closed loop model, and determining a worst case bound on the state evolution for the closed loop system 200. Scaling can also be performed by using a diagonal matrix state transformation. The controller can be implemented on the DSP using fractional binary format.

The present invention also can include a disc drive 110 with a data transducer and a disc 112 having a disc surface, rotatable relative to the data transducer. A servo actuator 206 is coupled to the data transducer to move the data transducer relative to the disc surface 112. A servo controller 204 is coupled to the servo actuator and controls actuation of the servo actuator 206 based on a bound on a state evolution for a closed loop system 200 including the servo controller 204 and the servo actuator 206.

In one embodiment, the state evolution is based on a state-space realization for the closed loop system. This state-space realization is also illustratively based on individual state-space realizations of the servo controller 204 and the servo actuator 206.

In another illustrative embodiment, the servo actuator 206 includes a coarse actuator 173 and at least one microactuator 159–161. The servo controller 204 is thus a multiple input multiple output controller 190. Although the present invention has been described with reference to preferred embodiments, workers skilled in the art will recognize that changes may be made in form and detail without departing from the spirit and scope of the invention.

What is claimed is:

1. A method of configuring a discrete-time servo controller in a fixed-point digital signal processor (DSP) for controlling a servo actuator in a disc drive the method comprising steps of:
   (a) calculating controller state bounds on controller states of the servo controller from a stable, closed-loop model representation of the servo controller and the servo actuator;
   (b) scaling the controller states based on the controller state bounds; and
   (c) configuring the servo controller, based on the scaled controller states, on the DSP.

2. The method of claim 1 wherein the calculating step (a) comprises a step of:
   (a)(1) based on a state-space realization for the servo controller and the servo actuator, deriving a closed loop state-space realization.

3. The method of claim 1 wherein the calculating step (a) comprises steps of:
   (a)(1) determining a worst case bound on a state evolution for a closed loop system including the servo controller and the servo actuator based on the stable, closed loop representation.

4. The method of claim 1 wherein the scaling step (b) comprises a step of:
   applying a diagonal matrix state transformation.

5. The method of claim 1 wherein the scaling step (b) yields a new controller realization, and wherein the configuring step (c) comprises a step of:
   configuring the servo controllers with a new controller realization on the DSP in a fractional binary format.

6. The method of claim 1 wherein the calculating step (a) consists essentially of:
   (a)(1) determining a worst case bound on a state evolution for a closed loop system including the servo controller and the servo actuator based on the stable, closed loop representation.

7. The method of claim 1 wherein the scaling step (b) consists essentially of:
   (b)(1) applying a diagonal matrix state transformation.

8. The method of claim 1 wherein the scaling step (b) yields a new controller realization, and wherein the configuring step (c) consists essentially of:

configuring the servo controllers with a new controller realization on the DSP in a fractional binary format.

9. A disc drive, comprising:

a data transducer;

a disc, having a disc surface, rotatable relative to the data transducer;

a servo actuator coupled to the data transducer to move the data transducer relative to the disc surface; and a servo controller coupled to the servo actuator and controlling actuation of the servo actuator, the servo controller being configured with controller states, scaled based on a bound on a state evolution for a closed loop system including the servo controller and the servo actuator.

10. The disc drive of claim 9 wherein the controller state bounds are based on a stable, closed-loop representation of the closed loop system.

11. The disc drive of claim 9 wherein the state evolution is based on a state-space realization for the closed loop system.

12. The disc drive of claim 11 wherein the state-space realization is based on individual state-space realizations of the servo controller and the servo actuator.

13. The disc drive of claim 12 wherein the servo controller is configured with the scaled controller states in fractional binary format.

14. The disc drive of claim 13 wherein the servo controller comprises a fixed-point DSP.

15. The disc drive of claim 9 wherein the servo actuator includes a coarse actuator and a microactuator, and wherein the servo controller comprises a multiple-input, multiple-output controller.

* * * * *